(12) United States Patent
Li et al.

(10) Patent No.: US 9,398,262 B2
(45) Date of Patent: Jul. 19, 2016

(54) COMMUNICATION USING AVATAR (75) Inventors: Wenlong Li, Beijing (CN); Xioafeng Tong, Beijing (CN); Yangzhou Du, Beijing (CN); Qiang Eric Li, Beijing (CN); Yimin Zhang, Beijing (CN); Wei Hu, Beijing (CN); John G. Tennant, El Dorado Hills, CA (US); Hui A. Li, Antioch, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/993,612

(22) PCT Filed: Dec. 29, 2011

(86) PCT No.: PCT/CN2011/084902
§ 371 (c)(1),
(2), (4) Date: Apr. 14, 2014

(87) PCT Pub. No.: WO2013/097139
PCT Pub. Date: Jul. 4, 2013

(65) Prior Publication Data
US 2014/0218459 A1 Aug. 7, 2014

(51) Int. Cl.
*H04N 7/15* (2006.01)
*H04N 21/4223* (2011.01)
*H04N 21/44* (2011.01)
*H04N 21/4788* (2011.01)
*H04N 21/81* (2011.01)
*G06K 9/00* (2006.01)

(52) U.S. Cl.
CPC ............ *H04N 7/157* (2013.01); *G06K 9/00248* (2013.01); *H04N 21/4223* (2013.01); *H04N 21/44008* (2013.01); *H04N 21/4788* (2013.01); *H04N 21/8146* (2013.01)

(58) Field of Classification Search
USPC ....................................... 348/14.01
See application file for complete search history.

(56) References Cited

U.S. PATENT DOCUMENTS

| | | | |
|---|---|---|---|
| 6,580,811 B2 * | 6/2003 | Maurer et al. ................. | 382/103 |
| 7,076,118 B1 * | 7/2006 | Westerman .................... | 382/305 |
| 2008/0059570 A1 * | 3/2008 | Bill ............................... | 709/203 |

(Continued)

FOREIGN PATENT DOCUMENTS

| | | |
|---|---|---|
| CN | 1972274 A | 5/2007 |
| CN | 101472158 A | 7/2009 |

(Continued)

OTHER PUBLICATIONS

International Search Report and Written Opinion received for PCT Patent Application No. PCT/CN2011/084902, mailed on Oct. 18, 2012, 10 Pages.

(Continued)

*Primary Examiner* — Joseph J Nguyen
(74) *Attorney, Agent, or Firm* — Grossman, Tucker, Perreault & Pfleger, PLLC (57) ABSTRACT

Generally this disclosure describes a video communication system that replaces actual live images of the participating users with animated avatars. A method may include selecting an avatar, initiating communication, capturing an image, detecting a face in the image, extracting features from the face, converting the facial features to avatar parameters, and transmitting at least one of the avatar selection or avatar parameters.

21 Claims, 5 Drawing Sheets

(56) References Cited

U.S. PATENT DOCUMENTS

| | | | |
|---|---|---|---|
| 2009/0055484 A1* | 2/2009 | Vuong et al. | 709/206 |
| 2012/0206558 A1* | 8/2012 | Setton | H04N 7/147 348/14.03 |
| 2013/0109302 A1* | 5/2013 | Levien et al. | 455/39 |

FOREIGN PATENT DOCUMENTS

| | | |
|---|---|---|
| CN | 102087750 A | 6/2011 |
| WO | 2012139276 | 10/2012 |

OTHER PUBLICATIONS

"Evaluation of Face Recognition Algorithms", Home Algorithms Data Related, Colorado State University, 2010, retrieved on Dec. 22, 2011, 1 page, available at: http://www.cs.colostate.edu/evalfacerec/index10.php.

3D Face Modeller: 3D Face Generator, downloaded from www.facegen.com/modeller.

3D PhotoFace, downloaded from www.oddcase.com/technologies/photoface.

* cited by examiner

COMMUNICATION USING AVATAR

FIELD

The following disclosure relates to video communication and interaction, and, more particularly, to methods and for video communication and interaction using avatars.

BACKGROUND

The increasing variety of functionality available in mobile devices has spawned a desire for users to communicate via video in addition to simple calls. For example, users may initiate "video calls," "videoconferencing," etc., wherein a camera and microphone in a device transmits audio and real-time video of a user to one or more other recipients such as other mobile devices, desktop computers, videoconferencing systems, etc. The communication of real time video may involve the transmission of substantial amounts of data (e.g., depending on the technology of the camera, the particular video codec employed to process the real time image information, etc.). Given the bandwidth limitations of existing 2G/3G wireless technology, and the still limited availability of emerging 4G wireless technology, the proposition of many device users conducting concurrent video calls places a large burden on bandwidth in the existing wireless communication infrastructure, which may impact negatively on the quality of the video call.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

Generally, this disclosure describes systems and methods for video communication and interaction using avatars. Using avatars, as opposed to live images, substantially reduces the amount of data to be transmitted, and thus, the avatar communication requires less bandwidth. In one embodiment an application is activated in a device coupled to a camera. The application may be configured to allow a user to select an avatar for display on a remote device, in a virtual space, etc. The device may then be configured to initiate communication with at least one other device, a virtual space, etc. For example, the communication may be established over a 2G, 3G, 4G cellular connection. Alternatively, the communication may be established over the Internet via a WiFi connection. After the communication is established, the camera may be configured to start capturing images. Facial detection/tracking is then performed on the captured images, and feature extraction is performed on the face. The detected face/head movements and/or changes in facial features are then converted into parameters usable for animating the avatar on the at least one other device, within the virtual space, etc. At least one of the avatar selection or avatar parameters are then transmitted. In one embodiment at least one of a remote avatar selection or remote avatar parameters are received. The remote avatar selection may cause the device to display an avatar, while the remote avatar parameters may cause the device to animate the displayed avatar. Audio communication accompanies the avatar animation via known methods.

Figure 1A:
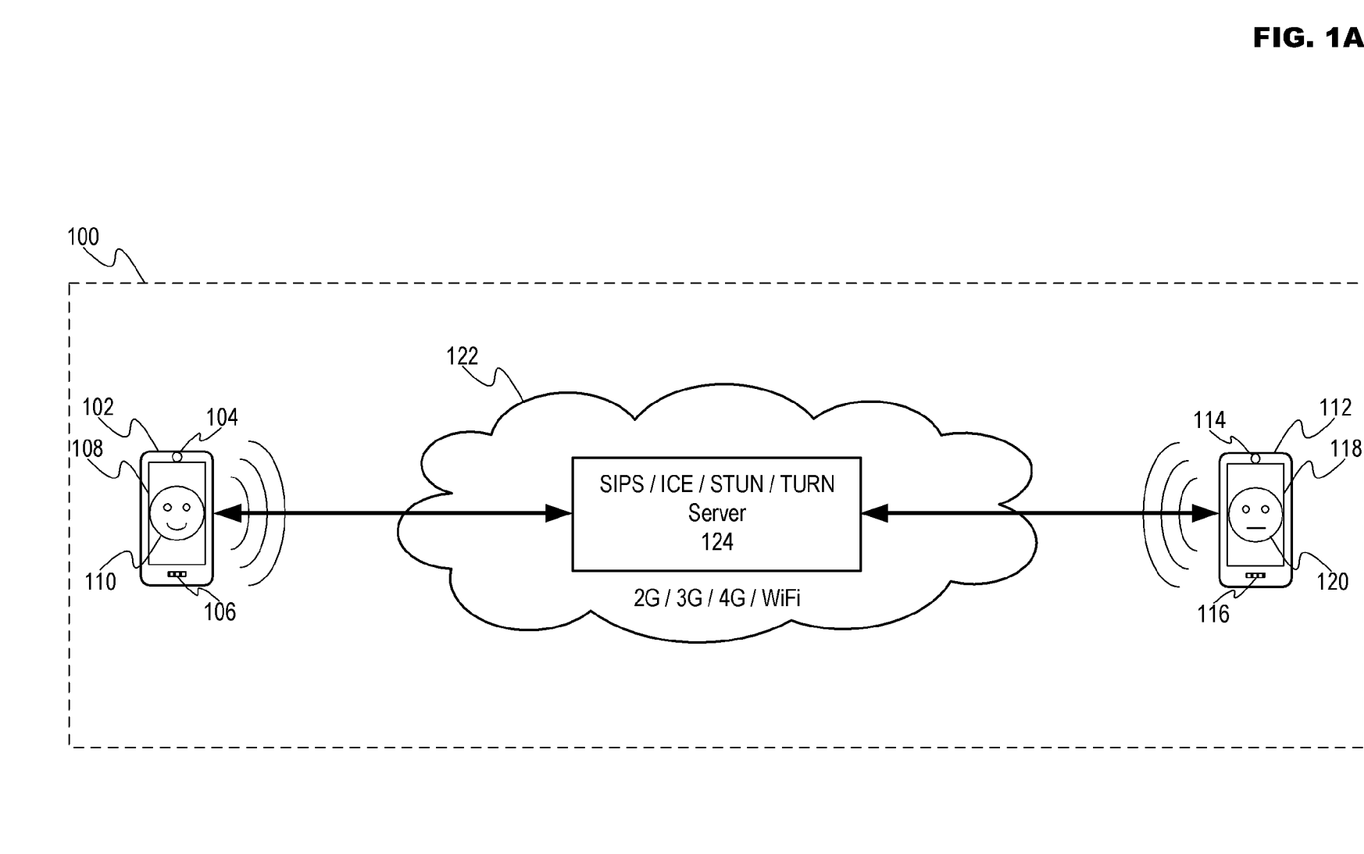
FIG. 1A illustrates an example device-to-device system in accordance with various embodiments of the present disclosure.

FIG. 1A illustrates device-to-device system 100 consistent with various embodiments of the present disclosure. System 100 may generally include devices 102 and 112 communicating via network 122. Device 102 includes at least camera 104, microphone 106 and display 108. Device 112 includes at least camera 114, microphone 116 and display 118. Network 122 includes at least server 124.

Devices 102 and 112 may include various hardware platforms that are capable of wired and/or wireless communication. For example, devices 102 and 112 may include, but are not limited to, videoconferencing systems, desktop computers, laptop computers, tablet computers, smart phones, (e.g., iPhones®, Android®-based phones, Blackberries®, Symbian®-based phones, Palm®-based phones, etc.), cellular handsets, etc. Cameras 104 and 114 include any device for capturing digital images representative of an environment that includes one or more persons, and may have adequate resolution for face analysis of the one or more persons in the environment as described herein. For example, cameras 104 and 114 may include still cameras (e.g., cameras configured to capture still photographs) or a video cameras (e.g., cameras configured to capture a moving images comprised of a plurality of frames). Cameras 104 and 114 may be configured to operate using light in the visible spectrum or with other portions of the electromagnetic spectrum not limited to the infrared spectrum, ultraviolet spectrum, etc. Cameras 104 and 114 may be incorporated within devices 102 and 112, respectively, or may be separate devices configured to communicate with devices 102 and 112 via wired or wireless communication. Specific examples of cameras 104 and 114 may include wired (e.g., Universal Serial Bus (USB), Ethernet, Firewire, etc.) or wireless (e.g., WiFi, Bluetooth, etc.) web cameras as may be associated with computers, video monitors, etc., mobile device cameras (e.g., cell phone or smart phone cameras integrated in, for example, the previously discussed example devices), integrated laptop computer cameras, integrated tablet computer cameras (e.g., iPad®, Galaxy Tab®, and the like), etc. Devices 102 and 112 may further comprise microphones 106 and 116.

Microphones 106 and 116 include any devices configured to sense sound. Microphones 106 and 116 may be integrated within devices 102 and 112, respectively, or may interact with the devices via wired or wireless communication such as described in the above examples regarding cameras 104 and 114. Displays 108 and 118 include any devices configured to display text, still images, moving images (e.g., video), user interfaces, graphics, etc. Displays 108 and 118 may be integrated within devices 102 and 112, respectively, or may interact with the devices via wired or wireless communication such as described in the above examples regarding cameras 104 and 114. In one embodiment, displays 108 and 118 are configured to display avatars 110 and 120, respectively. As referenced herein, an Avatar is defined as graphical representation of a user in either two-dimensions (2D) or three-dimensions (3D). Avatars do not have to resemble the looks of the user, and thus, while avatars can be lifelike representations they can also take the form of drawings, cartoons, sketches, etc. In system 100, device 102 may display avatar 110 representing the user of device 112 (e.g., a remote user), and likewise, device 112 may display avatar 120 representing the user of device 102. In this way users may see a representation of others user without having to exchange the large amounts of information involved with device-to-device communication employing live images.

Network 122 may include various second generation (2G), third generation (3G), fourth generation (4G) cellular-based data communication technologies, Wi-Fi wireless data communication technology, etc. Network 122 includes at least one server 124 configured to establish and maintain communication connections when using these technologies. For example, server 124 may be configured to support Internet-related communication protocols like Session Initiation Protocol (SIP) for creating, modifying and terminating two-party (unicast) and multi-party (multicast) sessions, Interactive Connectivity Establishment Protocol (ICE) for presenting a framework that allows protocols to be built on top of bytestream connections, Session Traversal Utilities for Network Access Translators, or NAT, Protocol (STUN) for allowing applications operating through a NAT to discover the presence of other NATs, IP addresses and ports allocated for an application's User Datagram Protocol (UDP) connection to connect to remote hosts, Traversal Using Relays around NAT (TURN) for allowing elements behind a NAT or firewall to receive data over Transmission Control Protocol (TCP) or UDP connections, etc.

Figure 1B:
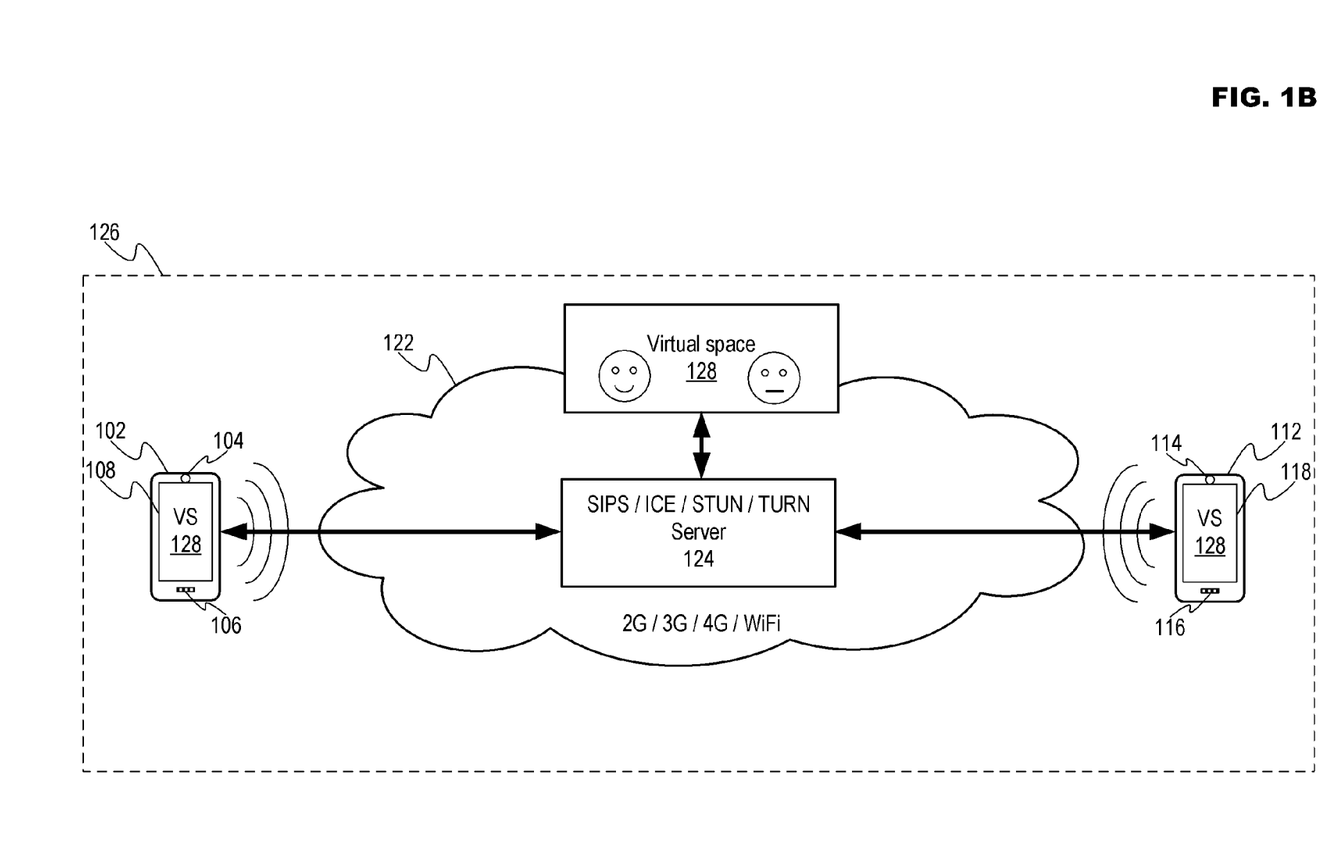
FIG. 1B illustrates an example virtual space system in accordance with various embodiments of the present disclosure.

FIG. 1B illustrates virtual space system 126 consistent with various embodiments of the present disclosure. System 126 may employ device 102, device 112 and server 124. Device 102, device 112 and server 124 may continue to communicate in the manner similar to that illustrated in FIG. 1A, but user interaction may take place in virtual space 128 instead of in a device-to-device format. As referenced herein, a virtual space may be defined as a digital simulation of a physical location. For example, virtual space 128 may resemble an outdoor location like a city, road, sidewalk, field, forest, island, etc., or an inside location like an office, house, school, mall, store, etc. Users, represented by avatars, may appear to interact in virtual space 128 as in the real world. Virtual space 128 may exist on one or more servers coupled to the Internet, and may be maintained by a third party. Examples of virtual spaces include virtual offices, virtual meeting rooms, virtual worlds like Second Life®, massively multiplayer online role-playing games (MMORPGs) like World of Warcraft®, massively multiplayer online real-life games (MMORLGs), like The Sims Online®, etc. In system 126, virtual space 128 may contain a plurality of avatars corresponding to different users. Instead of displaying avatars, displays 108 and 118 may display encapsulated (e.g., smaller) versions of virtual space (VS) 128. For example, display 108 may display a perspective view of what the avatar corresponding to the user of device 102 "sees" in virtual space 128. Similarly, display 118 may display a perspective view of what the avatar corresponding to the user of device 112 "sees" in virtual space 128. Examples of what avatars might see in virtual space 128 include, but are not limited to, virtual structures (e.g., buildings), virtual vehicles, virtual objects, virtual animals, other avatars, etc.

Figure 2:
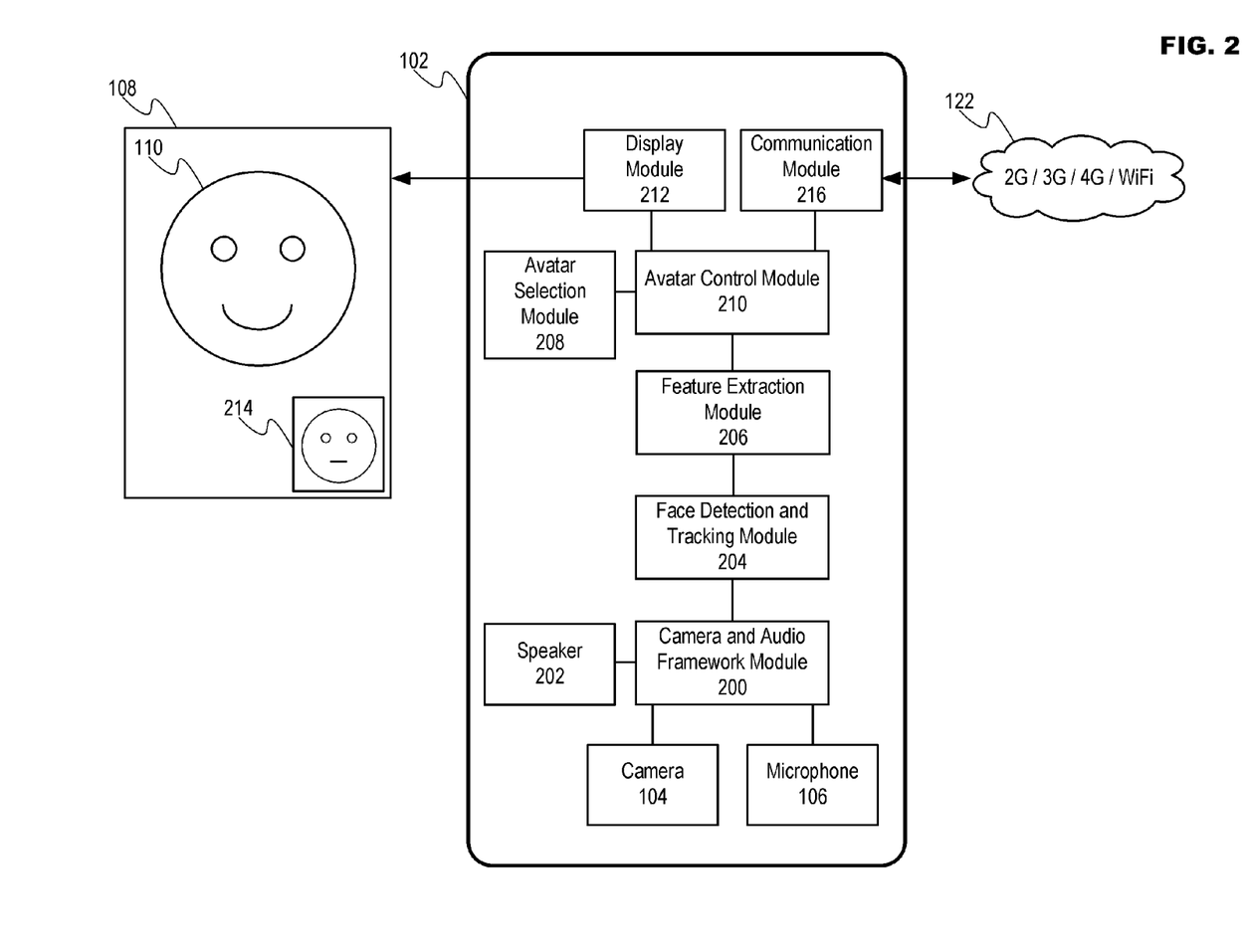
FIG. 2 illustrates an example device in accordance with various embodiments of the present disclosure.

FIG. 2 illustrates an example device 102 in accordance with various embodiments of the present disclosure. While only device 102 is described, device 112 (e.g., remote device) may include resources configured to provide the same or similar functions. As previously discussed, device 102 is shown including camera 104, microphone 106 and display 108. Camera 104 and microphone 106 may provide input to camera and audio framework module 200. Camera and audio framework module 200 may include custom, proprietary, known and/or after-developed audio and video processing code (or instruction sets) that are generally well-defined and operable to control at least camera 104 and microphone 106. For example, camera and audio framework module 200 may cause camera 104 and microphone 106 to record images and/or sounds, may process images and/or sounds, may cause images and/or sounds to be reproduced, etc. Camera and audio framework module 200 may vary depending on device 102, and more particularly, the operating system (OS) running in device 102. Example operating systems include iOS®, Android®, Blackberry® OS, Symbian®, Palm® OS, etc. Speaker 202 may receive audio information from camera and audio framework module 200 and may be configured to reproduce local sounds (e.g., to provide audio feedback of the user's voice) and remote sounds (e.g., the sound of the other parties engaged in a telephone, video call or interaction in a virtual place).

Facial detection and tracking module 204 may be configured to identify and track a head, face and/or facial region within image(s) provided by camera 104. For example, facial detection module 204 may include custom, proprietary, known and/or after-developed face detection code (or instruction sets), hardware, and/or firmware that are generally well-defined and operable to receive a standard format image (e.g., but not limited to, a RGB color image) and identify, at least to a certain extent, a face in the image. Facial detection and tracking module 204 may also be configured to track the detected face through a series of images (e.g., video frames at 24 frames per second) and to determine a head position based on the detected face. Known tracking systems that may be employed by facial detection/tracking module 104 may include particle filtering, mean shift, Kalman filtering, etc., each of which may utilize edge analysis, sum-of-square-difference analysis, feature point analysis, histogram analysis, skin tone analysis, etc.

Feature extraction module 206 may be configured to recognize features (e.g., the location and/or shape of facial landmarks such as eyes, eyebrows, nose, mouth, etc.) in the face detected by face detection module 204. In one embodiment, avatar animation may be based directly on sensed facial actions (e.g., changes in facial features) without facial expression recognition. The corresponding feature points on an avatar's face may follow or mimic the movements of the real person's face, which is known as "expression clone" or "performance-driven facial animation." Feature extraction module 206 may include custom, proprietary, known and/or after-developed facial characteristics recognition code (or instruction sets) that are generally well-defined and operable to receive a standard format image (e.g., but not limited to a RGB color image) from camera 104 and to extract, at least to a certain extent, one or more facial characteristics in the image. Such known facial characteristics systems include, but are not limited to, the CSU Face Identification Evaluation System by Colorado State University.

Feature extraction module 206 may also be configured to recognize an expression associated with the detected features (e.g., identifying whether a previously detected face happy, sad, smiling, frown, surprised, excited, etc.)). Thus, feature extraction module 206 may further include custom, proprietary, known and/or after-developed facial expression detection and/or identification code (or instruction sets) that is generally well-defined and operable to detect and/or identify expressions in a face. For example, feature extraction module 206 may determine size and/or position of the facial features (e.g., eyes, mouth, cheeks, teeth, etc.) and may compare these facial features to a facial feature database which includes a plurality of sample facial features with corresponding facial feature classifications (e.g., smiling, frown, excited, sad, etc.).

Avatar selection module 208 is configured to allow a user of device 102 to select an avatar for display on a remote device. Avatar selection module 208 may include custom, proprietary, known and/or after-developed user interface construction code (or instruction sets) that are generally well-defined and operable to present different avatars to a user so that the user may select one of the avatars. In one embodiment one or more avatars may be predefined in device 102. Predefined avatars allow all devices to have the same avatars, and during interaction only the selection of an avatar (e.g., the identification of a predefined avatar) needs to be communicated to a remote device or virtual space, which reduces the amount of information that needs to be exchanged. Avatars are selected prior to establishing communication, but may also be changed during the course of an active communication. Thus, it may be possible to send or receive an avatar selection at any point during the communication, and for the receiving device to change the displayed avatar in accordance with the received avatar selection.

Avatar control module 210 is configured to generate parameters for animating an avatar. Animation, as referred to herein, may be defined as altering the appearance of an image/model. A single animation may alter the appearance of a 2-D still image, or multiple animations may occur in sequence to simulate motion in the image (e.g., head turn, nodding, blinking, talking, frowning, smiling, laughing, winking, blinking, etc.) An example of animation for 3-D models includes deforming a 3-D wireframe model, applying a texture mapping, and re-computing the model vertex normal for rendering. A change in position of the detected face and/or extracted facial features may be may converted into parameters that cause the avatar's features to resemble the features of the user's face. In one embodiment the general expression of the detected face may be converted into one or more parameters that cause the avatar to exhibit the same expression. The expression of the avatar may also be exaggerated to emphasize the expression. Knowledge of the selected avatar may not be necessary when avatar parameters may be applied generally to all of the predefined avatars. However, in one embodiment avatar parameters may be specific to the selected avatar, and thus, may be altered if another avatar is selected. For example, human avatars may require different parameter settings (e.g., different avatar features may be altered) to demonstrate emotions like happy, sad, angry, surprised, etc. than animal avatars, cartoon avatars, etc. Avatar control module 208 may include custom, proprietary, known and/or after-developed graphics processing code (or instruction sets) that are generally well-defined and operable to generate parameters for animating the avatar selected by avatar selection module 208 based on the face/head position detected by face detection and tracking module 204 and/or the facial features detected by feature extraction module 206. For facial feature-based animation methods, 2-D avatar animation may be done with, for example, image warping or image morphing, whereas 3-D avatar animation may be done with free form deformation (FFD) or by utilizing the animation structure defined in a 3-D model of a head. Oddcast is an example of a software resource usable for 2-D avatar animation, while FaceGen is an example of a software resource usable for 3-D avatar animation.

In addition, in system 100 avatar control module 210 may receive a remote avatar selection and remote avatar parameters usable for displaying and animating an avatar corresponding to a user at a remote device. Avatar control module may cause display module 212 to display avatar 110 on display 108. Display module 208 may include custom, proprietary, known and/or after-developed graphics processing code (or instruction sets) that are generally well-defined and operable to display and animate an avatar on display 108 in accordance with the example device-to-device embodiment. For example, avatar control module 210 may receive a remote avatar selection and may interpret the remote avatar selection to correspond to a predetermined avatar. Display module 212 may then display avatar 110 on display 108. Moreover, remote avatar parameters received in avatar control module 210 may be interpreted, and commands may be provided to display module 212 to animate avatar 110. In one embodiment more than two users may engage in the video call. When more than two users are interacting in a video call, display 108 may be divided or segmented to allow more than one avatar corresponding to remote users to be displayed simultaneously. Alternatively, in system 126 avatar control module 210 may receive information causing display module 212 to display what the avatar corresponding to the user of device 102 is "seeing" in virtual space 128 (e.g., from the visual perspective of the avatar). For example, display 108 may display buildings, objects, animals represented in virtual space 128, other avatars, etc. In one embodiment avatar control module 210 may be configured to cause display module 212 to display "feedback" avatar 214. Feedback avatar 214 represents how the selected avatar appears on the remote device, in a virtual place, etc. In particular, feedback avatar 214 appears as the avatar selected by the user and may be animated using the same parameters generated by avatar control module 210. In this way the user may confirm what the remote user is seeing during their interaction.

Communication module 216 is configured to transmit and receive information for selecting avatars, displaying avatars, animating avatars, displaying virtual place perspective, etc. Communication module 216 may include custom, proprietary, known and/or after-developed communication processing code (or instruction sets) that are generally well-defined and operable to transmit avatar selections, avatar parameters and receive remote avatar selections and remote avatar parameters. Communication module 216 may also transmit and receive audio information corresponding to avatar-based interactions. Communication module 216 may transmits and receive the above information via network 122 as previously described.

Figure 3:
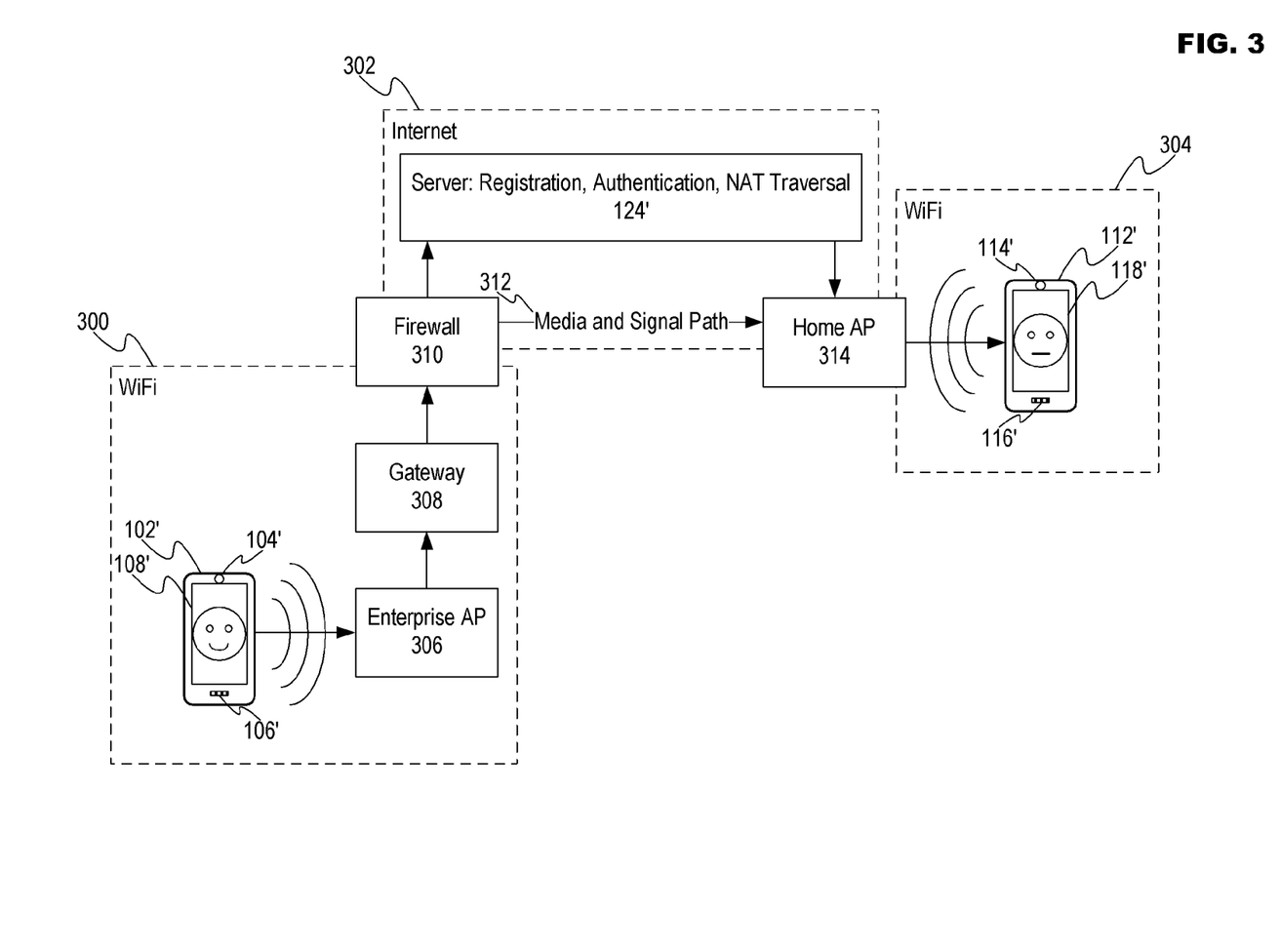
FIG. 3 illustrates an example system implementation in accordance with at least one embodiment of the present disclosure.

FIG. 3 illustrates an example system implementation in accordance with at least one embodiment. Device 102' is configured to communicate wirelessly via WiFi connection 300 (e.g., at work), server 124' is configured to negotiate a connection between devices 102' and 112' via Internet 302, and apparatus 112' is configured to communicate wirelessly via another WiFi connection 304 (e.g., at home). In one embodiment a device-to-device avatar-based video call application is activated in apparatus 102'. Following avatar selection, the application may allow at least one remote device (e.g., device 112') to be selected. The application may then cause device 102' to initiate communication with device 112'. Communication may be initiated with device 102' transmitting a connection establishment request to device 112' via enterprise access point (AP) 306. Enterprise AP 306 may be an AP usable in a business setting, and thus, may support higher data throughput and more concurrent wireless clients than home AP 314. Enterprise AP 306 may receive the wireless signal from device 102' and may proceed to transmit the connection establishment request through various business networks via gateway 308. The connection establishment request may then pass through firewall 310, which may be configured to control information flowing into and out of the WiFi network 300.

The connection establishment request of device 102' may then be processed by server 124'. Server 124' may be configured for registration of IP addresses, authentication of destination addresses and NAT traversals so that the connection establishment request may be directed to the correct destination on Internet 302. For example, server 124' may resolve the intended destination (e.g., remote device 112') from information in the connection establishment request received from device 102', and may route the signal to through the correct NATs, ports and to the destination IP address accordingly. These operations may only have to be performed during connection establishment, depending on the network configuration. In some instances operations may be repeated during the video call in order to provide notification to the NAT to keep the connection alive. Media and Signal Path 312 may carry the video (e.g., avatar selection and/or avatar parameters) and audio information direction to home AP 314 after the connection has been established. Device 112' may then receive the connection establishment request and may be configured to determine whether to accept the request. Determining whether to accept the request may include, for example, presenting a visual narrative to a user of device 112' inquiring as to whether to accept the connection request from device 102'. Should the user of device 112' accept the connection (e.g., accept the video call) the connection may be established. Cameras 104' and 114' may be configured to then start capturing images of the respective users of devices 102' and 112', respectively, for use in animating the avatars selected by each user. Microphones 106' and 116' may be configured to then start recording audio from each user. As information exchange commences between devices 102' and 112', displays 108' and 118' may display and animate avatars corresponding to the users of devices 102' and 112'.

Figure 4:
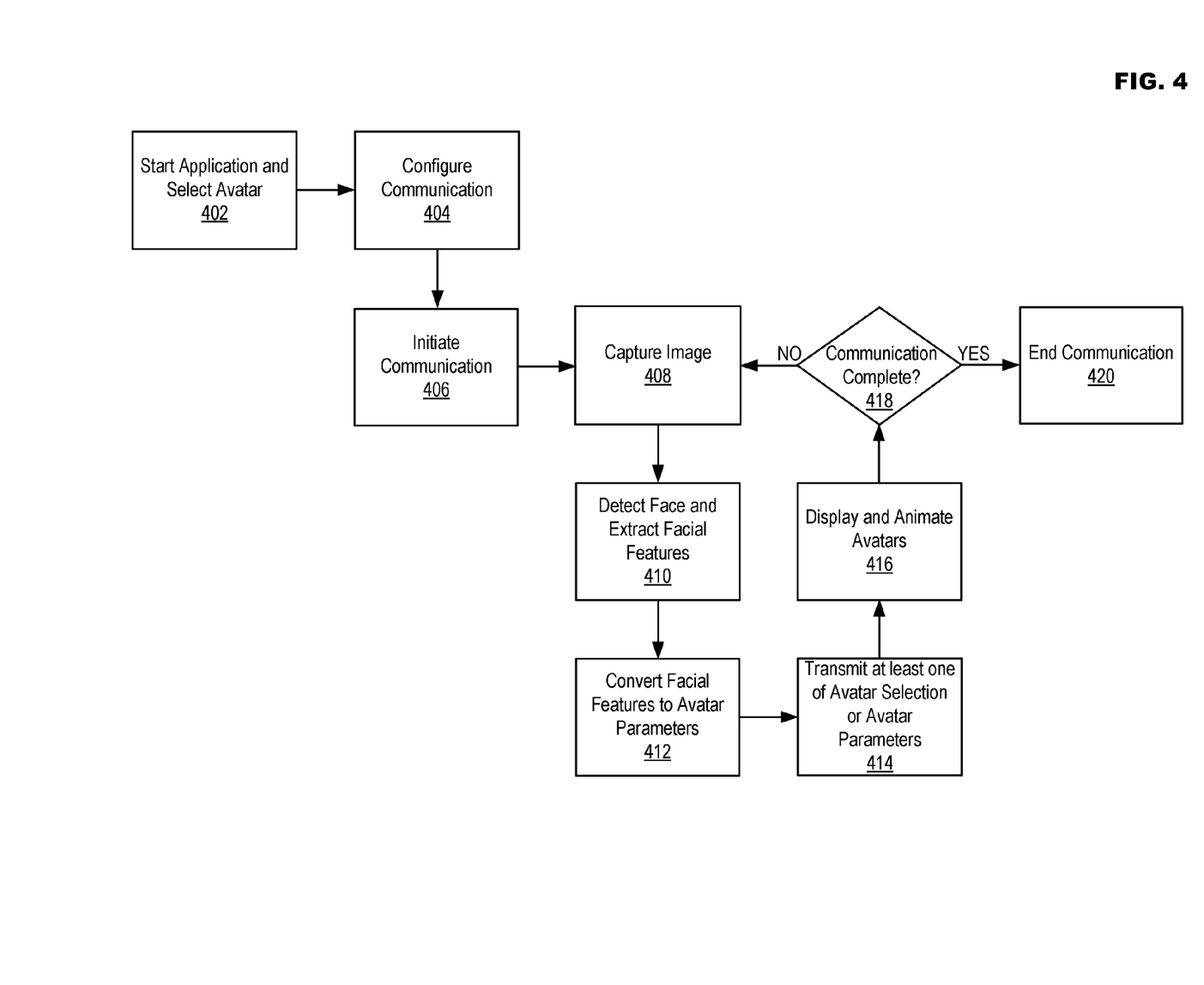
FIG. 4 is a flowchart of example operations in accordance with at least one embodiment of the present disclosure.

FIG. 4 is a flowchart of example operations in accordance with at least one embodiment. In operation 402 an application (e.g., an avatar-based voice call application) may be activated in a device. Activation of the application may be followed by selection of an avatar. Selection of an avatar may include an interface being presented by the application, the interface allowing the user to select a predefined avatar. After avatar selection, communications may be configured in operation 404. Communication configuration includes the identification of at least one remote device or a virtual space for participation in the video call. For example, a user may select from a list of remote users/devices stored within the application, stored in association with another system in the device (e.g., a contacts list in a smart phone, cell phone, etc.), stored remotely, such as on the Internet (e.g., in a social media website like Facebook, LinkedIn, Yahoo, Google+, MSN, etc.). Alternatively, the user may select to go online in a virtual space like Second Life.

In operation 406, communication may be initiated between the device and the at least one remote device or virtual space. For example, a connection establishment request may be transmitted to the remote device or virtual space. For the sake of explanation herein, it is assumed that the connection establishment request is accepted by the remote device or virtual space. A camera in the device may then begin capturing images in operation 408. The images may be still images or live video (e.g., multiple images captured in sequence). In operation 410 image analysis may occur starting with detection/tracking of a face/head in the image. The detected face may then be analyzed in order to extract facial features (e.g., facial landmarks, facial expression, etc.). In operation 412 the detected face/head position and/or facial features are converted into Avatar parameters. Avatar parameters are used to animate the selected avatar on the remote device or in the virtual space. In operation 414 at least one of the avatar selection or the avatar parameters may be transmitted.

Avatars may be displayed and animated in operation 416. In the instance of device-to-device communication (e.g., system 100), at least one of remote avatar selection or remote avatar parameters may be received from the remote device. An avatar corresponding to the remote user may then be displayed based on the received remote avatar selection, and may be animated based on the received remote avatar parameters. In the instance of virtual place interaction (e.g., system 126), information may be received allowing the device to display what the avatar corresponding to the device user is seeing. A determination may then be made in operation 418 as to whether the current communication is complete. If it is determined in operation 418 that the communication is not complete, operations 408-416 may repeat in order to continue to display and animate an avatar on the remote apparatus based on the analysis of the user's face. Otherwise, in operation 420 the communication may be terminated. The video call application may also be terminated if, for example, no further video calls are to be made.

While FIG. 4 illustrates various operations according to an embodiment, it is to be understood that not all of the operations depicted in FIG. 4 are necessary for other embodiments. Indeed, it is fully contemplated herein that in other embodiments of the present disclosure, the operations depicted in FIG. 4 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical locations. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

Thus, the present disclosure provides a method and system for conducting a video communication using avatars instead of live images. The use of avatars reduces the amount of information to exchange as compared to the sending of live images. An avatar is selected and then communication may be established. A camera in each device may captures images of the participants. The images may be analyzed to determine the face position and facial features. The face position and/or facial features are then converted into avatar parameters, and at least one of the avatar selection or the avatar parameters are transmitted to display/animate.

According to one aspect there is provided a method. The method may include selecting an avatar, initiating communication, capturing an image, detecting a face in the image, extracting features from the face, converting the facial features to avatar parameters, and transmitting at least one of the avatar selection or avatar parameters.

According to another aspect there is provided a system. The system may include a camera configured to capture images, a communication module configured to transmit and receive information, and one or more storage mediums. In addition, the one or more storage mediums having stored thereon, individually or in combination, instructions that when executed by one or more processors result in the following operations comprising selecting an avatar, initiating communication, capturing an image, detecting a face in the image, extracting features from the face, converting the facial features to avatar parameters, and transmitting at least one of the avatar selection or avatar parameters.

According to another aspect there is provided a system. The system may include one or more storage mediums having stored thereon, individually or in combination, instructions that when executed by one or more processors result in the following operations comprising selecting an avatar, initiating communication, capturing an image, detecting a face in the image, extracting features from the face, converting the facial features to avatar parameters, and transmitting at least one of the avatar selection or avatar parameters.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A system, comprising:
   a display;
   a camera configured to capture a first and second image;
   a communication circuitry configured to transmit and receive information; and
   one or more non-transitory storage memories having stored thereon, individually or in combination, instructions that when executed by one or more processors result in the following operations comprising:
   initiating a communication link with a remote system; and
   during the communication link,
      detecting a face of a user in each of the first and the second images;
      extracting a plurality of facial features from the face detected in the first image;
      extracting a plurality of facial features from the face detected in the second image;
      converting the facial features extracted from the first image to a first set of a plurality of avatar parameters;
      converting the facial features extracted from the second image to a second set of a plurality of avatar parameters;
      causing the first set of the plurality of avatar parameters to be transmitted to the remote system;
      after causing the first set of the plurality of avatar parameters to be transmitted, causing the second set of the plurality of avatar parameters to be transmitted to the remote system to cause a remote avatar on the remote system to be substantially continuously animated; and
      generating a feedback avatar on said display of said system that is substantially continuously animated based on the first set and the second set of the plurality of avatar parameters, said feedback avatar corresponding to said remote avatar being displayed on said remote system.

2. The system of claim 1, wherein extracting features from the face comprises determining a facial expression in the face.

3. The system of claim 1, wherein the avatar parameters are used to generate an avatar on a remote device, the avatar being based on the facial features.

4. The system of claim 1, wherein the avatar parameters are used to generate an avatar in a virtual space, the avatar being based on the facial features.

5. The system of claim 1, wherein the instructions that when executed by one or more processors result in the following additional operations:
   receiving at least one of a remote avatar selection or remote avatar parameters.

6. The system of claim 5, further comprising a display, wherein the instructions that when executed by one or more processors result in the following additional operations:
   displaying an avatar based on the remote avatar selection.

7. The system of claim 6, wherein the instructions that when executed by one or more processors result in the following additional operations:
   animating the displayed avatar based on the remote avatar parameters.

8. A system comprising one or more non-transitory storage memories having stored thereon, individually or in combination, instructions that when executed by one or more processors result in the following operations comprising:
   initiating a communication link between a user system and a remote system;
   capturing a first and a second image; and
   during the communication link,
      detecting a face of a user in each of the first and the second images;
      extracting a plurality of facial features from the face detected in the first image;

extracting a plurality of facial features from the face detected in the second image;
converting the facial features extracted from the first image to a first set of a plurality of avatar parameters;
converting the facial features extracted from the second image to a second set of a plurality of avatar parameters;
causing the first set of the plurality of avatar parameters to be transmitted to the remote system;
after causing the first set of the plurality of avatar parameters to be transmitted, causing the second set of the plurality of avatar parameters to be transmitted to the remote system to cause a remote avatar on the remote system to be substantially continuously animated; and
generating a feedback avatar on a display of said user system that is substantially continuously animated based on the first set and the second set of the plurality of avatar parameters, said feedback avatar corresponding to said remote avatar being displayed on said remote system.

9. The system of claim 8, wherein extracting features from the face comprises determining a facial expression in the face.

10. The system of claim 8, wherein the avatar parameters are used to generate an avatar on a remote device, the avatar being based on the facial features.

11. The system of claim 8, wherein the avatar parameters are used to generate an avatar in a virtual space, the avatar being based on the facial features.

12. The system of claim 8, wherein the instructions that when executed by one or more processors result in the following additional operations:
receiving at least one of a remote avatar selection or remote avatar parameters.

13. The system of claim 12, further comprising a display, wherein the instructions that when executed by one or more processors result in the following additional operations:
displaying an avatar based on the remote avatar selection.

14. The system of claim 13, wherein the instructions that when executed by one or more processors result in the following additional operations:
animating the displayed avatar based on the remote avatar parameters.

15. A method, comprising:
initiating a communication link between a user system and a remote system;
capturing a first and a second image with a camera of said user system; and
during the communication link,
detecting a face of a user in each of the first and the second images;
extracting a plurality of facial features from the face detected in the first image;
extracting a plurality of facial features from the face detected in the second image;
converting the facial features extracted from the first image to a first set of a plurality of avatar parameters;
converting the facial features extracted from the second image to a second set of a plurality of avatar parameters;
transmitting the first set of the plurality of avatar parameters to the remote system;
after transmitting the first set of the plurality of avatar parameters, transmitting the second set of the plurality of avatar parameters to the remote system to cause a remote-avatar on the remote system to be substantially continuously animated; and
generating a feedback avatar on a display of said user system that is substantially continuously animated based on the first set and the second set of the plurality of avatar parameters, said feedback avatar corresponding to said remote avatar being displayed on said remote system.

16. The method of claim 15, wherein extracting features from the face comprises determining a facial expression in the face.

17. The method of claim 15, wherein the avatar parameters are used to generate an avatar on a remote device, the avatar being based on the facial features.

18. The method of claim 15, wherein the avatar parameters are used to generate an avatar in a virtual space, the avatar being based on the facial features.

19. The method of claim 15, further comprising receiving at least one of a remote avatar selection or remote avatar parameters.

20. The method of claim 19, further comprising displaying an avatar based on the remote avatar selection.

21. The method of claim 20, further comprising animating the displayed avatar based on the remote avatar parameters.

* * * * *